United States Patent
Tsai

(10) Patent No.: US 10,494,266 B2
(45) Date of Patent: Dec. 3, 2019

(54) WATER FILTRATION SYSTEM

(71) Applicant: Chih-Hao Tsai, Taichung (TW)

(72) Inventor: Chih-Hao Tsai, Taichung (TW)

( * ) Notice: Subject to any disclaimer, the term of this patent is extended or adjusted under 35 U.S.C. 154(b) by 0 days.

(21) Appl. No.: 15/671,361

(22) Filed: Aug. 8, 2017

(65) Prior Publication Data

US 2019/0047874 A1 Feb. 14, 2019

(51) Int. Cl.
*C02F 1/00* (2006.01)
*B01D 35/30* (2006.01)
*C02F 9/00* (2006.01)
*C02F 1/44* (2006.01)

(52) U.S. Cl.
CPC .......... *C02F 1/003* (2013.01); *B01D 35/301* (2013.01); *C02F 9/005* (2013.01); *B01D 2201/302* (2013.01); *C02F 1/001* (2013.01); *C02F 1/441* (2013.01); *C02F 2201/004* (2013.01); *C02F 2201/006* (2013.01)

(58) Field of Classification Search
None
See application file for complete search history.

(56) References Cited

U.S. PATENT DOCUMENTS 3,926,815 A * 12/1975 McClory ............... B01D 35/043
 137/625.22
5,045,197 A * 9/1991 Burrows ................ B01D 61/08
 210/321.78
6,173,999 B1 * 1/2001 Guest .................... F16L 37/091
 285/323
7,387,210 B2 * 6/2008 Burrows ............... B01D 35/153
 210/443
2009/0308799 A1 * 12/2009 Cho ...................... B01D 35/301
 210/232

FOREIGN PATENT DOCUMENTS

TM M426435 U 4/2012
TW M323930 U 12/2007
TW M338689 U 8/2008

* cited by examiner

*Primary Examiner* — Benjamin M Kurtz
(74) *Attorney, Agent, or Firm* — Muncy, Geissler, Olds & Lowe, P.C.

(57) ABSTRACT

A water filtration system includes at least one filter cartridge, a seat body and a flow guide adapter. The seat body has a connecting portion defining two passages respectively connected downward to water inlet and outlet of the filter cartridge. The seat body further has a main passageway that has two apertures in communication with the passages of the connecting portion. The flow guide adapter is inserted in an entrance of the main passageway of the seat body, and has a tube fitting portion, a flow guiding portion integrally extending from the tube fitting portion, and an interior tunnel extending through the tube fitting portion to the flow guiding portion for receiving water flow from a conduit. In particular, the flow guiding portion guides water flow from the interior tunnel to the filter cartridge and then back to the main passageway of the seat body.

4 Claims, 17 Drawing Sheets

WATER FILTRATION SYSTEM

BACKGROUND OF THE INVENTION

1. Field of the Invention

The present invention relates to a water filtration system, and more particularly to a canister type water filtration system with replaceable filters.

2. Description of the Related Art

In general, a water filtration system is equipped with a plurality of filter cartridges for water purification, delivering cleaner, cleaner drinking water. One type of water filtration system is illustrated in Taiwan Patent No. M4264350. In this system, each of the filter cartridges (22) has a seat body (23) mounted to a common board (21). To communicate with one another, the filter cartridges (22) are connected by a tubing system interconnected with the seat bodies (23) such that water flow may run through the filter cartridges (22) in a predetermined order to deliver purified water to the faucet for drinking.

Another type of water filtration system is illustrated in Taiwan Patent No. M323930 or No. M338689. In each system, the three filter cartridges (21, 201, 202) are detachably mounted to a common seat body (10) which enables the water flow to run through the filter cartridges in series for water filtration. This design makes the structure of the water filtration system a lot easier. However, as can be understood, the seat body (10) can hardly be manufactured due to a demolding problem caused by the three blocking walls (not numbered) employed in the main passageway of the seat body (10) for guiding water flow to the filter cartridges in series.

SUMMARY OF THE INVENTION

Accordingly, it is an object of the present invention to provide a water filtration system that employs a seat body that can support two or more filter cartridges and be formed in one piece without any demolding problem.

Briefly described, the water filtration system of this invention includes a first filter cartridge, a seat body, and a first flow guide adapter. The first filter cartridge has in its top a water inlet and a water outlet. The seat body has at its bottom a first connecting portion defining first and second passages respectively connected downward to the water inlet and outlet of the first filter cartridge. The seat body further has a main passageway in its top, and the main passageway has at least two apertures defined in a bottom thereof and in communication with the respective first and second passages of the first connecting portion. The first flow guide adapter is inserted in an entrance of the main passageway of the seat body, and has a tube fitting portion for connection with a first conduit, a flow guiding portion integrally extending from the tube fitting portion, and an interior tunnel extending through the tube fitting portion to the flow guiding portion for receiving water flow from the first conduit. In particular, the flow guiding portion is configured to guide water flow from the interior tunnel to the first filter cartridge and then back to the main passageway of the seat body.

Preferred embodiments of the invention may have the following additional characteristics, either alone or in combination:

The flow guiding portion of the first flow guide adapter has a radial opening and a first blocking wall. The radial opening connects the interior tunnel of the first flow guide adapter and the first passage of the first connecting portion. The first blocking wall is situated in a position within the main passageway of the seat body and between the first and second passages of the first connecting portion of the seat body to force the water flow in the interior tunnel of the first flow guide adapter to run through the radial opening of the flow guiding portion and the first passage of the first connecting portion of the seat body into the first filter cartridge, and then return back through the second passage of the first connecting portion to the main passageway of the seat body.

Alternatively, the water filtration system may further include a second filter cartridge. The second filter cartridge has in its top a water inlet and a water outlet. The seat body further has at its bottom a second connecting portion which defines first and second passages respectively connected downward to the water inlet and outlet of the second filter cartridge. The main passageway of the seat body further has two apertures defined in a bottom thereof and in communication with the respective first and second passages of the second connecting portion. The flow guiding portion of the first flow guide adapter further has a second blocking wall, a shank disposed in the main passageway of the seat body and connecting the first and second blocking walls, and at least one channel defined in between an outer wall of the shank and an inner wall of the main passageway of the seat body to receive the water flow returned back to the main passageway from the first filter cartridge. The second blocking wall is situated in a position within the main passageway of the seat body and between the first and second passages of the second connecting portion of the seat body to force the water flow in the channel of the flow guiding portion to run through the first passage of the second connecting portion of the seat body into the second filter cartridge, and then return back through the second passage of the second connecting portion into the main passageway of the seat body.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
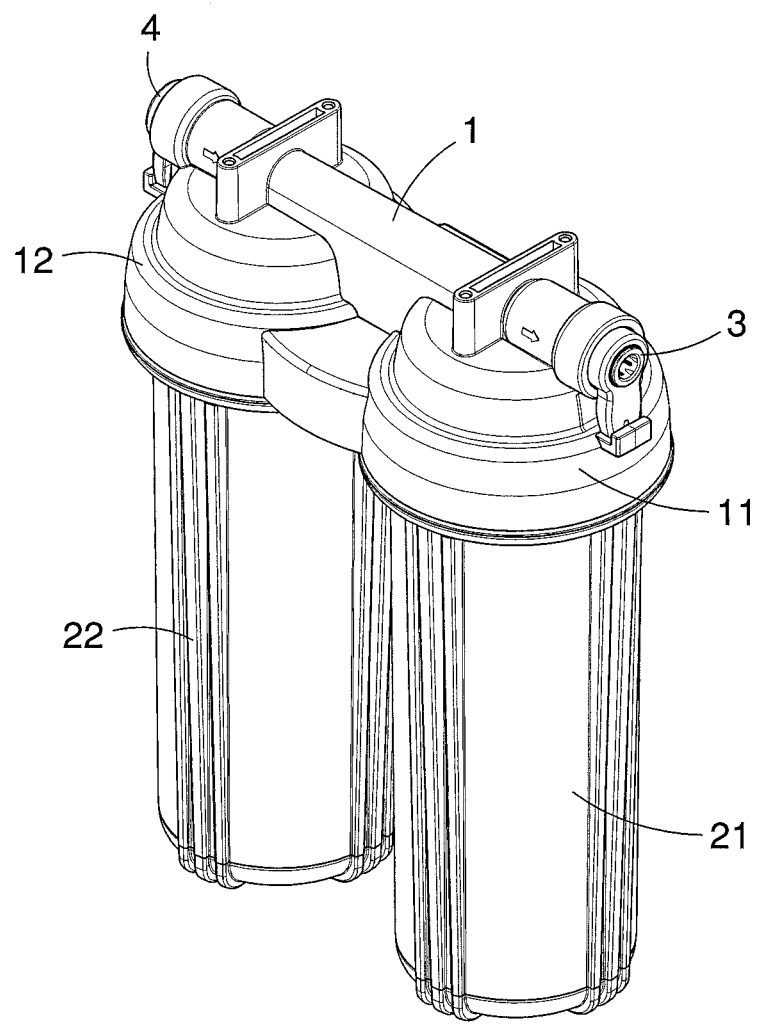
FIG. 1 is a perspective view of a water filtration system in accordance with a first embodiment of the present invention.
Figure 2:
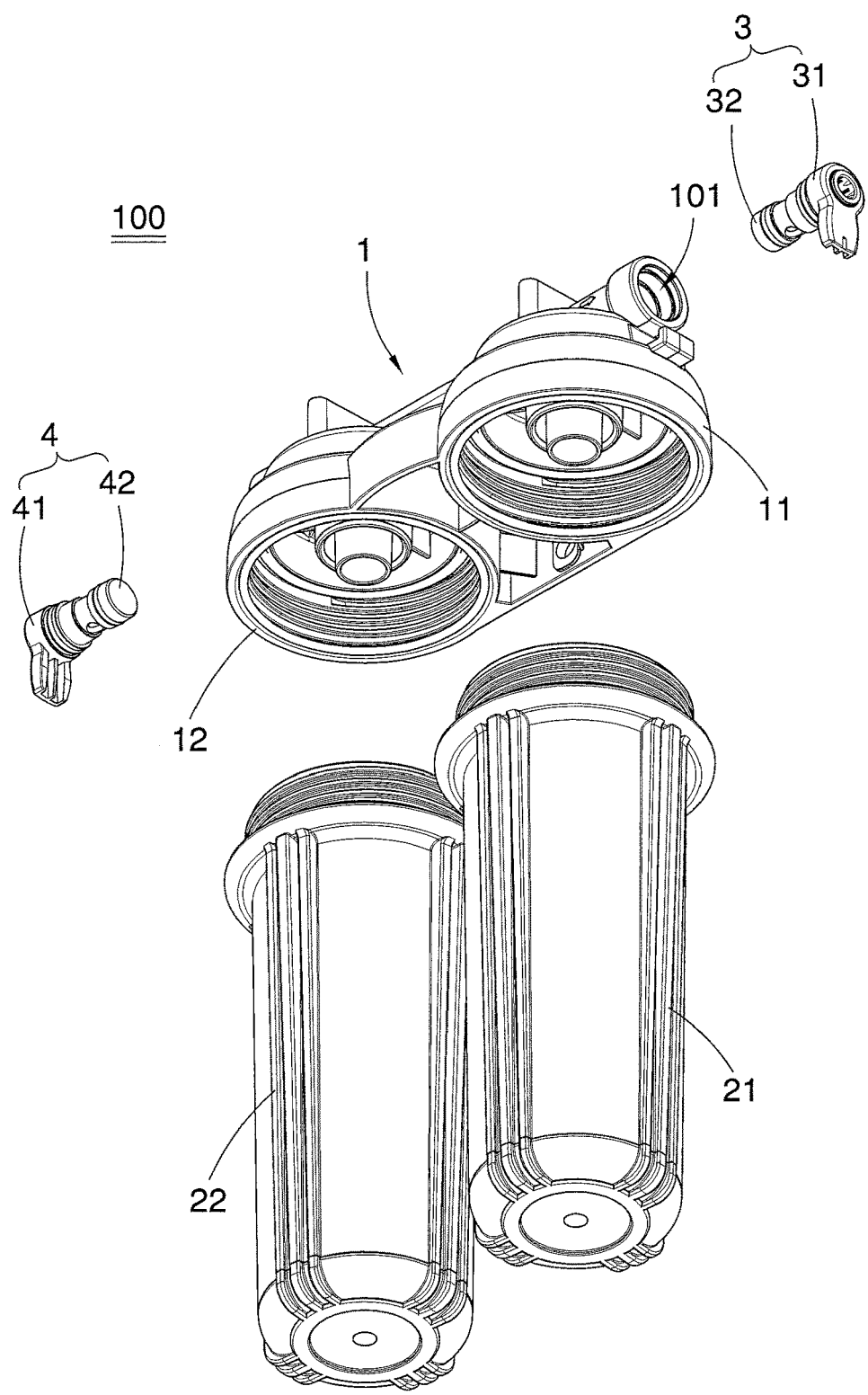
FIG. 2 is an exploded perspective view of the water filtration system shown in FIG. 1.

Referring to FIGS. 1 to 8, there is shown a first embodiment of the water filtration system 100. As shown in FIG. 2, the water filtration system 100 generally includes a seat body 1, first and second filter cartridges 21, 22 mounted underneath the seat body 1, and two flow guide adapters 3, 4 attached to two opposite sides of the seat body 1. The first and second filter cartridges 21, 22 are detachably mounted to the seat body 1. Each of the filter cartridges 21, 22 has a cartridge member and a filter medium disposed within the cartridge member. The flow guide adapter 3, 4 are configured to guide water flow through the seat body as well as all the filter cartridges 21, 22 in a predetermined order for water purification. In addition, the flow guide adapter 3, 4 are provided also for connection with external conduits (not shown). Each of the filter cartridges 21, 22 has in its top a water inlet and a water outlet.

Figure 3:
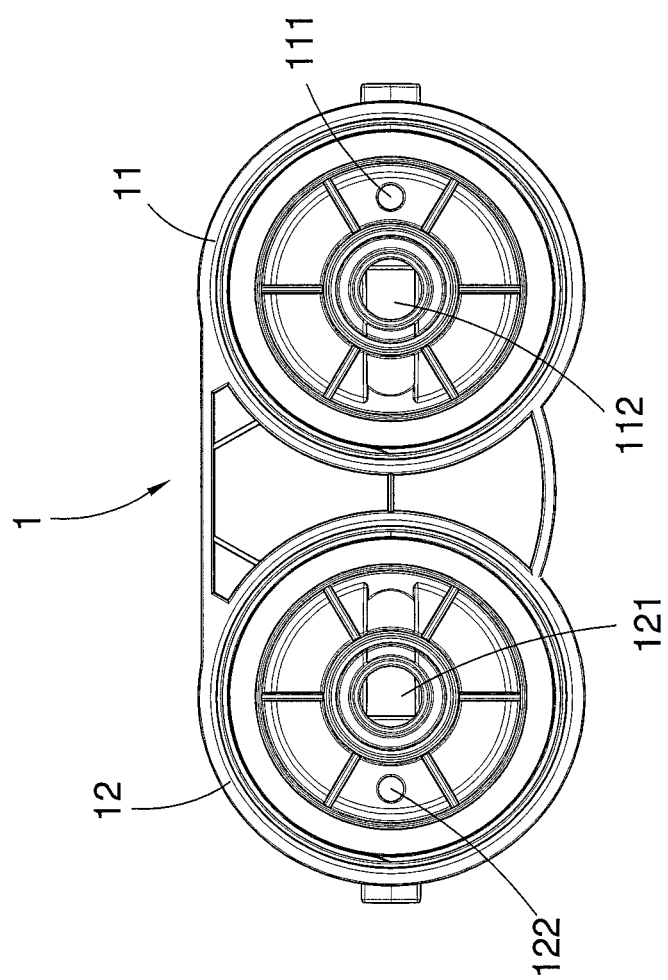
FIG. 3 is a bottom view of a seat body of the water filtration system shown in FIG. 2.
Figure 4:
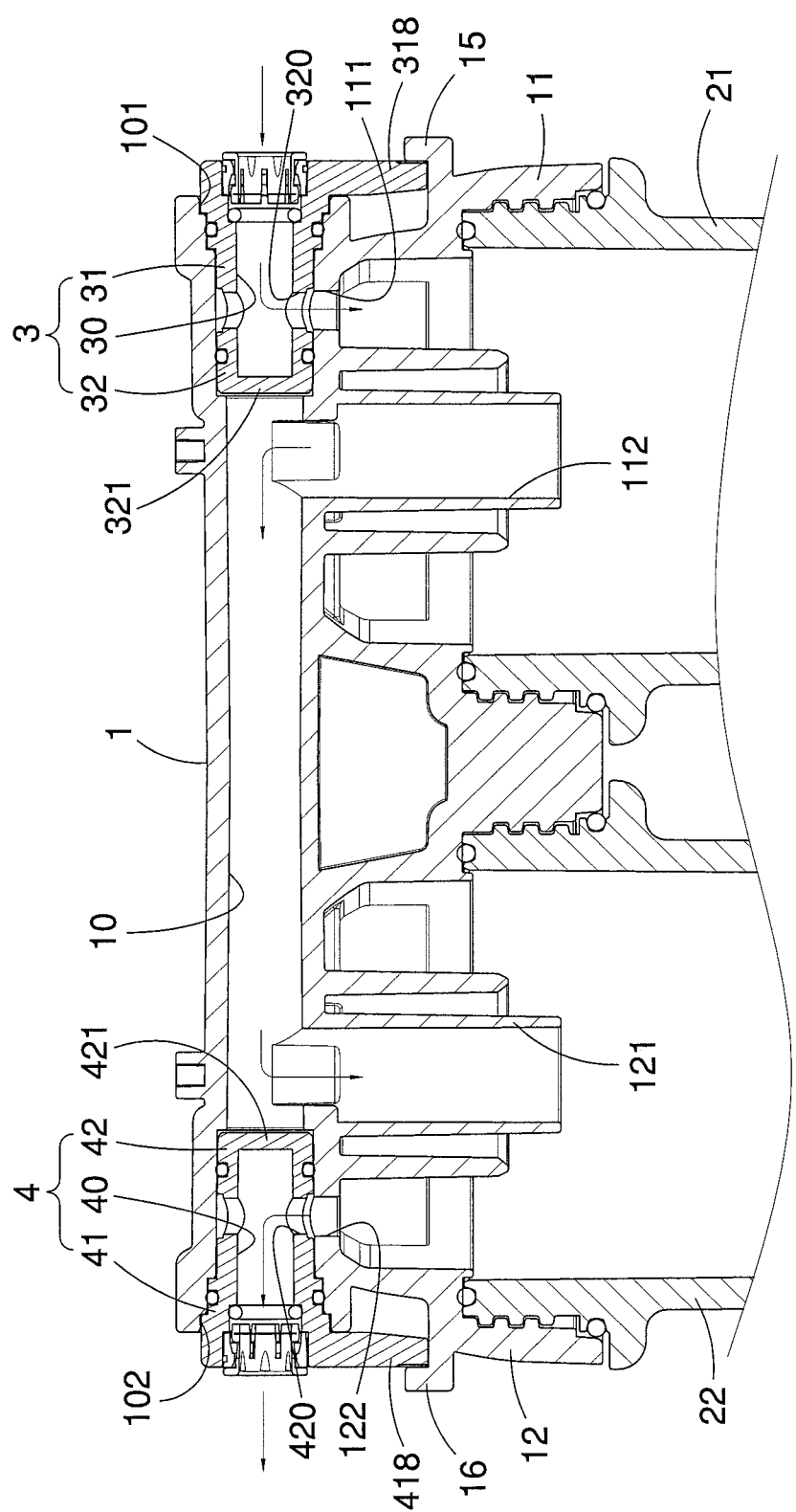
FIG. 4 is a cross-sectional view of the water filtration system shown in FIG. 1.

Specifically, the seat body 1 is formed at its bottom with two connecting portions 11 and 12 for connection with the two filter cartridges 21, 22. As shown in FIGS. 3 and 4, the first connecting portion 11 defines first and second passages 111, 112 respectively connected downward to the water inlet and outlet of the first filter cartridge 21. Similarly, the second connecting portion 12 defines first and second passages 121, 122 respectively connected downward to the water inlet and outlet of the second filter cartridge 22. Additionally, the seat body 1 further has in its top a main passageway 10 extending from right to left through the seat body 1. The main passageway 10 has at its bottom two apertures (not numbered) in communication with the respective first and second passages 111, 112 of the first connecting portion 11, and another two apertures (not numbered) in communication with the respective first and second passages 121, 122 of the second connecting portion 12. The main passageway 10 further has an entrance 101 and an exit 102 for reception of the two flow guide adapters 3, 4.

As shown in FIG. 4, the two flow guide adapters 3, 4 are identical to each other in structure and inserted in the respective entrance 101 and exit 102 of the main passageway 10. Specifically, the first flow guide adapter 3 includes a tube fitting portion 31, a flow guiding portion 32 and an interior tunnel 30 extending through the tube fitting portion 31 to the flow guiding portion 32 to receive water flow from a first conduit (not shown). The tube fitting portion 31 is situated in the entrance 101 of the main passageway 10 of the seat body 1, and is provided for connection with the first conduit. The flow guiding portion 32 is integrally extending from the tube fitting portion 31 and is situated in the main passageway 10 of the seat body 1 for guiding water flow from the interior tunnel 30 to the first filter cartridge 21 and then back to the main passageway 10 of the seat body 1. In a similar manner, the second flow guide adapter 4 has a tube fitting portion 41, a flow guiding portion 42 and an interior tunnel 40 extending through the tube fitting portion 41 to the flow guiding portion 42 to guide water flow to a second conduit (not shown). The tube fitting portion 41 is situated in the exit 102 of the main passageway 10 of the seat body 1, and is provided for connection with the second conduit. The flow guiding portion 42 is integrally extending from the tube fitting portion 41 and is situated in the main passageway 10 of the seat body 1 for guiding water flow from the main passageway 10 of the seat body 1 to the second filter cartridge 22 and then back to the interior tunnel 40 of the second flow guide adapter 4, and finally to the second conduit.

Figure 5:
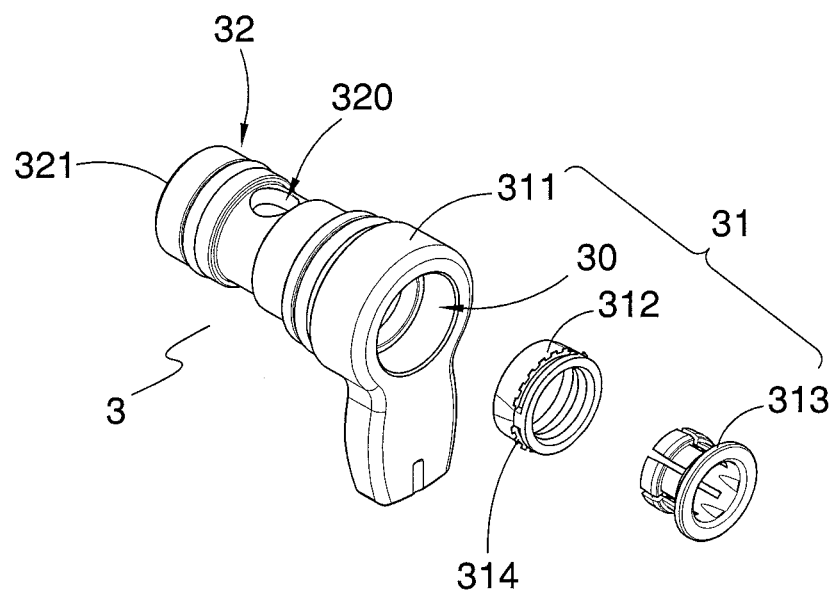
FIG. 5 is a perspective view of a first flow guide adapter of the water filtration system shown in FIG. 2.
Figure 6:
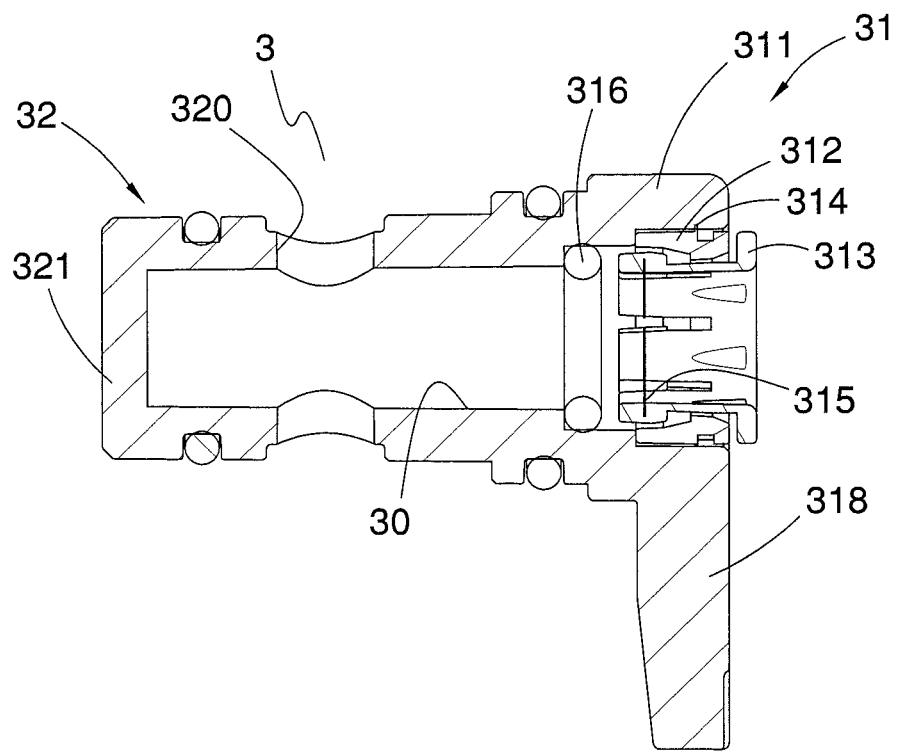
FIG. 6 is a cross-sectional view of the first flow guide adapter shown in FIG. 5.

More specifically, as shown in FIG. 5, the tube fitting portion 31 of the first flow guide adapter 3 is directed to a quick coupling, which includes a coupling body 311 disposed in the entrance 101 of the main passageway 10 of the seat body 1, an annular seat 312 disposed in the coupling body 311, a clamping claw 313 disposed in the annular seat 312, a plurality of first engaging teeth 314 disposed on an outer periphery of the annular seat 312, a plurality of second engaging teeth 315 disposed on an inner periphery of the clamping claw 313, and a sealing ring 316 positioned in the interior tunnel 30 of the first flow guide adapter 3. The coupling body 311 is connected with the flow guiding portion 32 and located in the entrance 101 of the main passageway 10 of the seat body 1, as shown in FIG. 4. Additionally, the coupling body 311 further includes an extension 318 to be fastened to a keeper 15 (see FIG. 4). Referring to FIG. 6, the annular seat 312 is nested in an enlarged opening of the interior tunnel 30 of the first flow guide adapter 3. The clamping claw 313 is provided to receive and clasp the first conduit. The first engaging teeth 314 are provided to secure the annular seat 312 within the coupling body 311. And the second engaging teeth 315 are provided to grip the first conduit once the first conduit is inserted into the clamping claw 313.

Referring again to FIGS. 5 and 6, the flow guiding portion 32 of the first flow guide adapter 3 has a radial opening 320 and a blocking wall 321. The radial opening 320 of the flow guiding portion 32 connects the interior tunnel 30 of the first flow guide adapter 3 and the first passage 111 of the first connecting portion 11 of the seat body 1, as shown in FIG. 4. On the other hand, the blocking wall 321 of the flow guiding portion 32 is situated in a position within the main passageway 10 of the seat body 1 and between the first and second passages 111, 112 of the first connecting portion 11 of the seat body 1 so as to force the water flow in the interior tunnel 30 of the first flow guide adapter 3 to run through the radial opening 320 of the flow guiding portion 32 and the first passage 111 of the first connecting portion 11 of the seat body 1 into the first filter cartridge 21, and then return back through the second passage 112 of the first connecting portion 11 to the main passageway 10 of the seat body 1.

More precisely, upon entering into the interior tunnel 30 from the first conduit, the water flow will soon be blocked by the blocking wall 321 of the flow guiding portion 32, which in turn guide the water flow through the radial opening 320 and the first passage 111 of the first connecting portion 11 of the seat body 1 to the first filter cartridge 21 for first filtration. The filtered water flow will then return back through the second passage 112 of the first connecting portion 11 of the seat body 1 to the main passageway 10 of the seat body 1.

Figure 7:
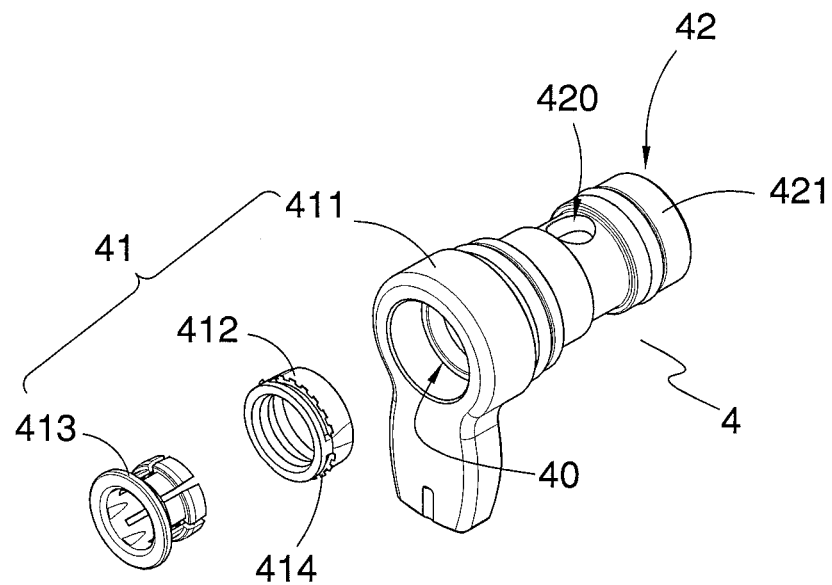
FIG. 7 is a perspective view of a second flow guide adapter of the water filtration system shown in FIG. 2.
Figure 8:
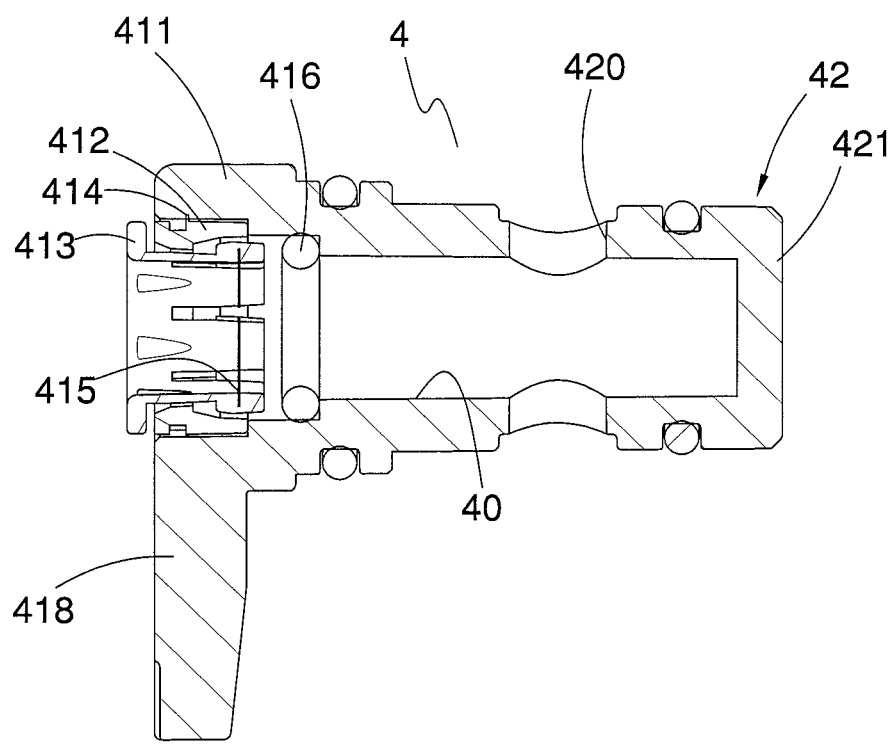
FIG. 8 is a cross-sectional view of the second flow guide adapter shown in FIG. 7.

Similarly, as shown in FIGS. 7 and 8, the flow guiding portion 41 of the second flow guide adapter 4 is directed to a quick coupling, which includes a coupling body 411 disposed in the exit 102 of the main passageway 10 of the seat body 1, an annular seat 412 disposed in the coupling body 411, a clamping claw 413 disposed in the annular seat 412, a plurality of first engaging teeth 414 disposed on an outer periphery of the annular seat 412, a plurality of second engaging teeth 415 disposed on an inner periphery of the clamping claw 413, and a sealing ring 416 positioned in the interior tunnel 40 of the second flow guide adapter 4. The coupling body 411 is connected with the flow guiding portion 42 and located in the exit 102 of the main passageway 10 of the seat body 1, as shown in FIG. 4. Additionally, the coupling body 411 further includes an extension 418 to be fastened to a keeper 16 (see FIG. 4). Referring to FIG. 6, the annular seat 412 is nested in an enlarged opening of the interior tunnel 40 of the second flow guide adapter 4. The clamping claw 413 is provided to receive and clasp the second conduit. The first engaging teeth 414 are provided to secure the annular seat 412 within the coupling body 411. And the second engaging teeth 415 are provided to grip the second conduit once the second conduit is inserted into the clamping claw 413.

The flow guiding portion 42 of the second flow guide adapter 4 has a radial opening 420 and a blocking wall 421. The radial opening 420 connects the interior tunnel 40 of the second flow guide adapter 4 and the second passage 122 of the second connecting portion 12. The blocking wall 421 is situated in a position within the main passageway 10 of the seat body 1 and between the first and second passages 121, 122 of the second connecting portion 12 of the seat body 1 so as to force the water flow in the main passageway 10 of the seat body 1 to run through the first passage 121 of the second connecting portion 12 of the seat body 1 into the second filter cartridge 22, and then return back through the second passage 122 of the second connecting portion 12 and the radial opening 420 of the flow guiding portion 42 into the interior tunnel 40 of the second flow guide adapter 4 and finally to the second conduit. More precisely, upon entering into the main passageway 10 of the seat body 1 from the second passage 112 of the first connecting portion 11 of the seat body 1, the water flow will soon be blocked by the blocking wall 421 of the flow guiding portion 42, which in turn guide the water flow through the first passage 121 of the first connecting portion 12 of the seat body 1 to the second filter cartridge 22 for second filtration. The filtered water flow will then return back through the second passage 122 of the second connecting portion 12 of the seat body 1 and the radial opening 420 of the flow guiding portion 42 to the interior tunnel 40 of the second flow guide adapter 4, and finally to the second conduit.

As shown in FIG. 4 of the first embodiment, the water filtration system 100 employs the flow guide adapters 3, 4, each of which is used for both of tube coupling with an external conduit and flow guiding among the seat body and the filter cartridges. Upon entry into the interior tunnel 30 of the first flow guide adapter 3 from the first conduit, the water flow is firstly blocked by the blocking wall 321 of the flow guiding portion 32 and turns downward to the first filter cartridge 21 for the first filtration. After the first filtration, the water flow returns upward back to the main passageway 10 of the seat body 1, and then be secondly blocked by the blocking wall 42 of the flow guiding portion 42 of the second flow guide adapter 4, and turns downward to the second filter cartridge 22 for the second filtration. Afterward, the water flow returns upward to the interior tunnel 40 of the second flow guide adapter 4, and finally to the second conduit.

As described in the first embodiment, the water filtration system employs a seat body which is configured to connect with two filter cartridges. The seat body has a main passageway that extends from right to left through the seat body. Thus, the seat body can be easily formed in one piece without any demolding problem. Moreover, the water filtration system employs two unique flow guide adapters, which cooperates with the seat body to create a purification route for the water flow running through the filter cartridges in a predetermined order. Thus, the water filtration system is relatively simple in structure and easy to manufacture.

Figure 9:
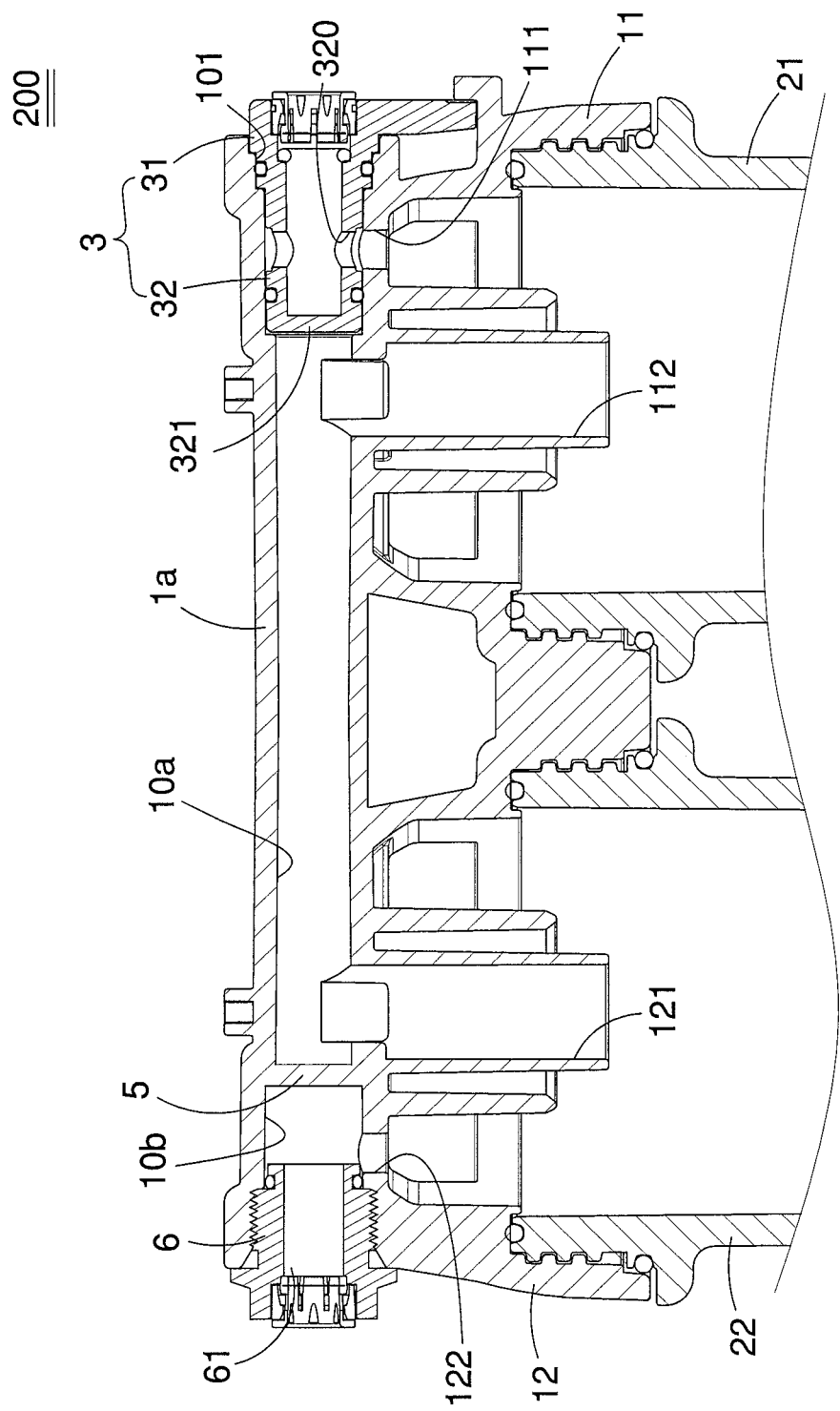
FIG. 9 is a perspective view of a water filtration system in accordance with a second embodiment of the present invention.
Figure 10:
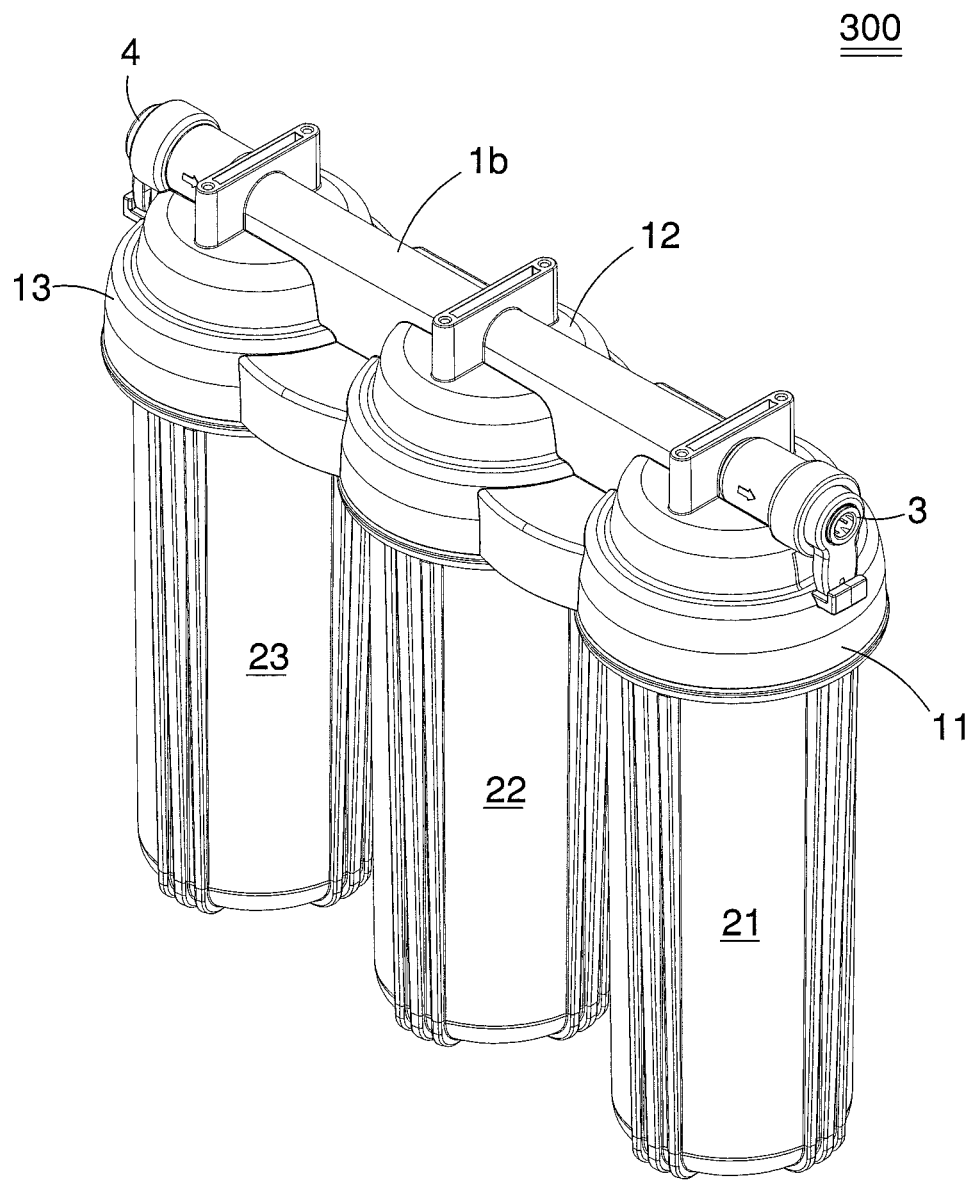
FIG. 10 is a perspective view of a water filtration system in accordance with a third embodiment of the present invention.

Referring now to FIG. 9, a water filtration system 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The water filtration system 200 of the second embodiment is substantially identical to that of the first embodiment, except that a partition wall 5 is integrally formed in the main passageway of the seat body 1a and divides the main passageway into a right-side passage 10a and a left-side passage 10b; and the tube fitting portion 41 of the second flow guide adapter 4 of the first embodiment is replaced with a conventional tube fitting 6, such as a screw-type quick coupling.

More specifically, the partition wall 5 is integratedly formed in the main passageway of the seat body 1a and divides the main passageway into a right-side passage 10a and a left-side passage 10a. The tube fitting 6 is fastened in an exit 102 of the left-side passage 10a of the seat body 1a and has an interior tunnel 61 for receiving a second conduit. More precisely, the partition wall 5 is situated in a position within the main passageway and between the first and second passages 121, 122 of the second connecting portion 12 of the seat body 1a so as to force the water flow in the right-side passage 10a to run through the first passage 121 of the second connecting portion 12 of the seat body 1a to the second filter cartridge 22, and then return back through the second passage 122 of the second connecting portion 12 of the seat body 1a to the left-side passage 10b of the seat body 1a, the interior tunnel 61 of the tube fitting 6, and finally to the second conduit.

From the foregoing, it is apparent that the water flow process in the second embodiment is similar to that of the first embodiment, and therefore will not be discussed further for the sake of brevity. Most importantly, even though the seat body 1a of the water filtration system 200 fails to have a cut-through main passageway 10 as in FIG. 4, the right-side passage 10a and the left-side passage 10b are separated by a single wall, namely the partition wall 5 and therefore the seat body 1a and the partition wall 5 together can still be easily formed in one piece with any demolding problem.

Figure 11:
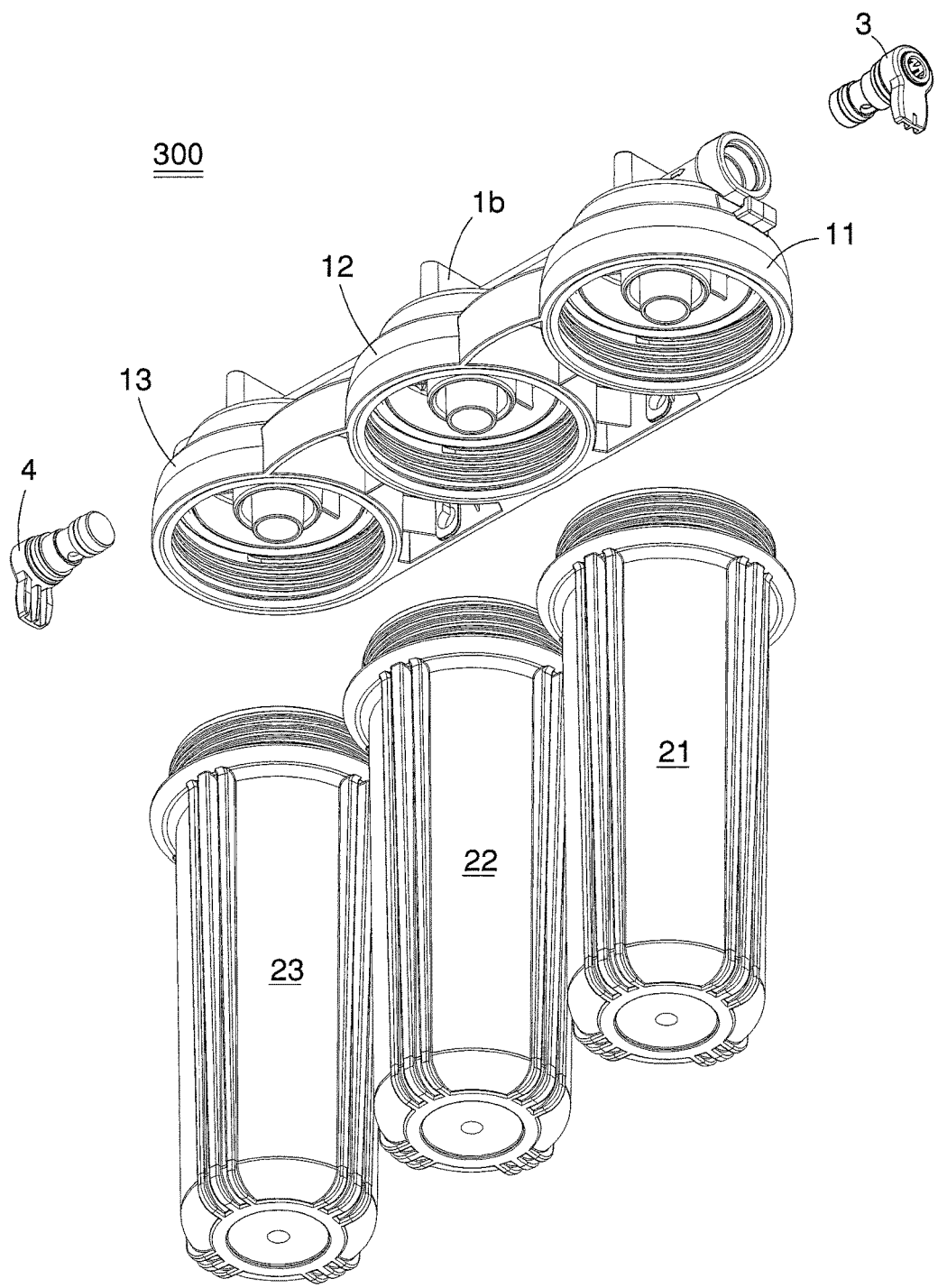
FIG. 11 is an exploded perspective view of the water filtration system shown in FIG. 10.

With reference to FIGS. 10 to 13, a water filtration system 300 in accordance with a third embodiment will now be explained. In view of the similarity among the first, second and third embodiments, the parts of the third embodiment that are identical to the parts of the first or second embodiment will be given the same reference numerals as the parts of the first or second embodiment. As shown in FIG. 11, the water filtration system 300 includes a seat body 1b, three filter cartridges 21~23 detachably mounted underneath the seat body 1b, and two flow guide adapters 3, 4 attached to two opposite sides of the seat body 1b. Each of the filter cartridges 21~23 has a cartridge member and a filter medium disposed within the cartridge member. However, unlike the first embodiment, there is no a cut-through main passageway 10, but a combination of a right-side passage 10a and a left-side passage 10b separated by a partition wall 5 formed in the seat body 1b. However, the two flow guide adapters 3, 4 of the third embodiment are identical to those of the first embodiment, shown in FIGS. 5~8.

Figure 12:
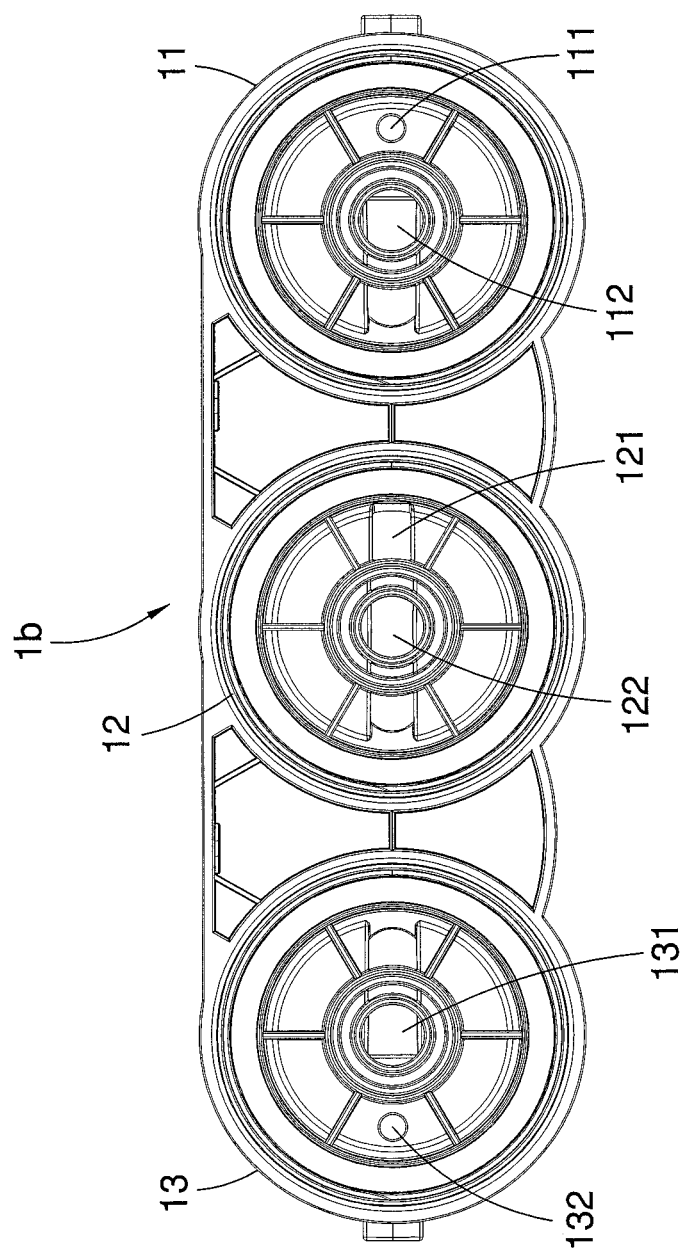
FIG. 12 is a bottom view of a seat body of the water filtration system shown in FIG. 11.
Figure 13:
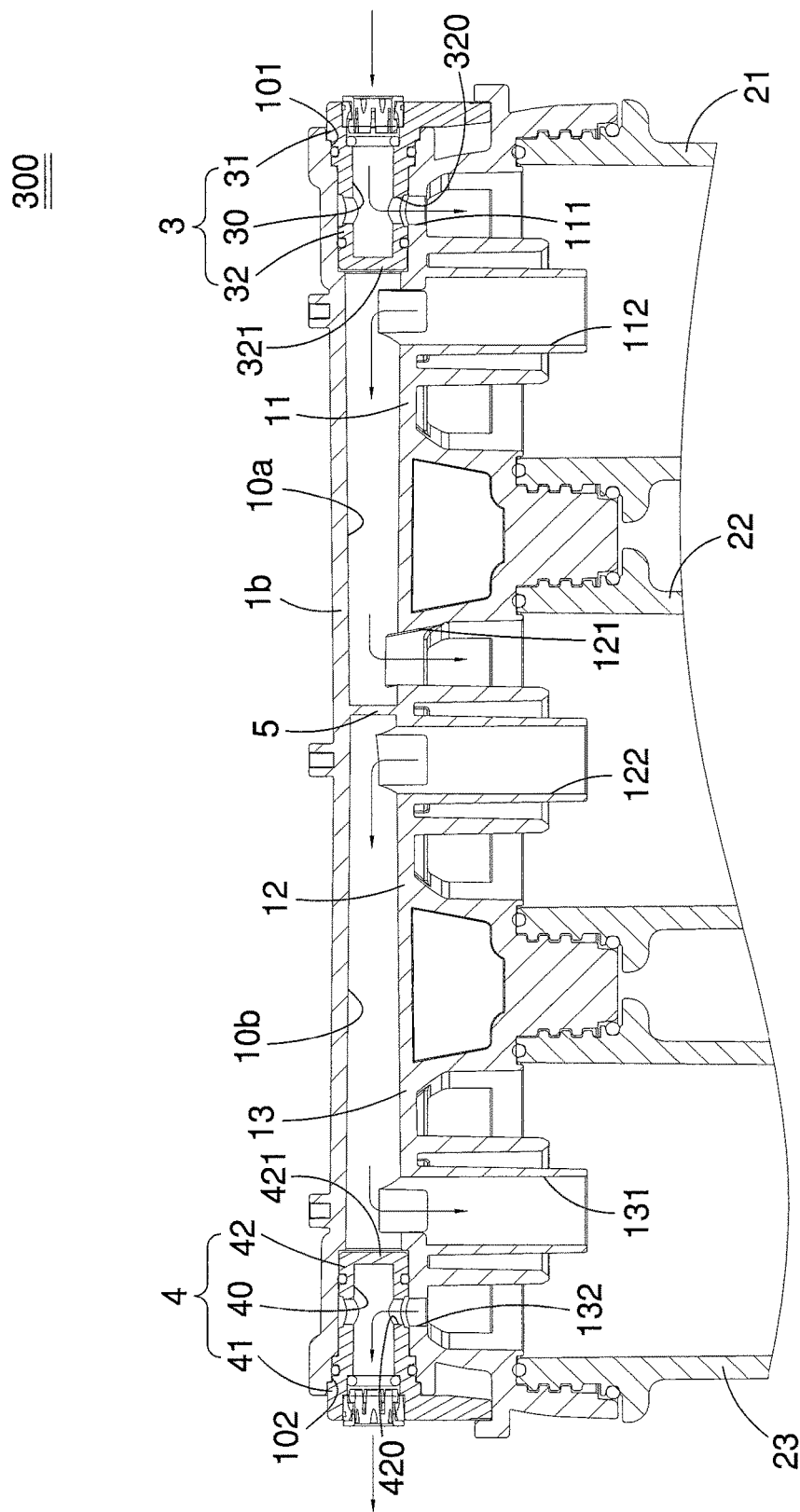
FIG. 13 is a cross-sectional view of the water filtration system shown in FIG. 10.
Figure 14:
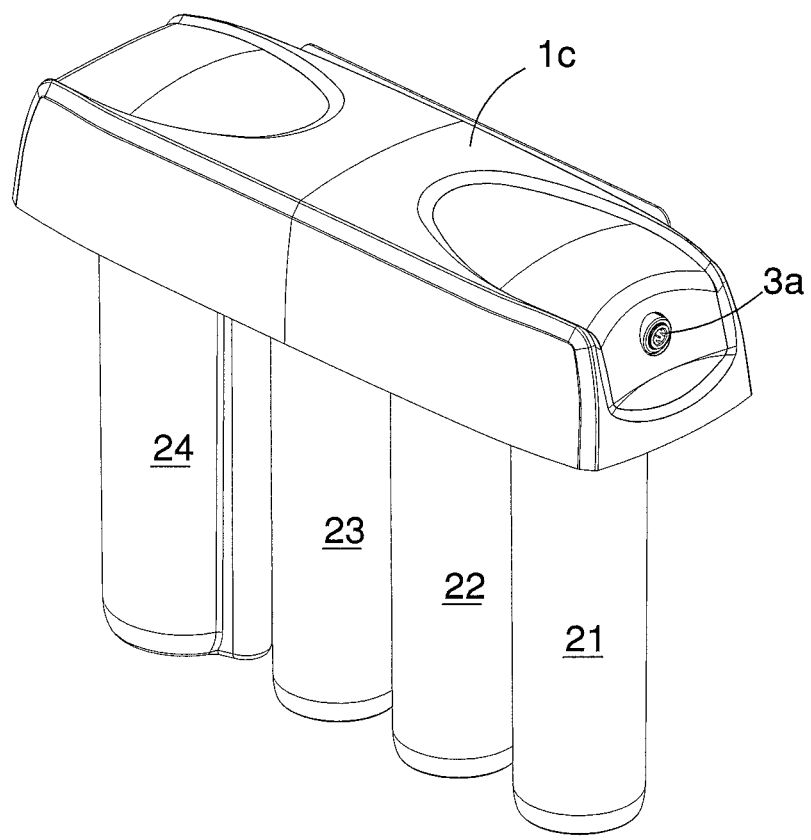
FIG. 14 is a perspective view of a water filtration system in accordance with a fourth embodiment of the present invention.

Specifically, the seat body 1b is formed at its bottom with three connecting portions 11~13 for connection with the three filter cartridges 21~23. As shown in FIGS. 12 and 13, the first connecting portion 11 defines first and second passages 111, 112 respectively connected downward to the water inlet and outlet of the first filter cartridge 21. Similarly, the second connecting portion 12 defines first and second passages 121, 122 respectively connected downward to the water inlet and outlet of the second filter cartridge 22; and the third connecting portion 13 defines first and second passages 131, 132 respectively connected downward to the water inlet and outlet of the third filter cartridge 23. The right-side passage 10a of the seat body 1b has at its bottom two apertures in communication with the first and second passage 111, 112 of the first connecting portion 11, and another one aperture in communication with the first passage 121 of the second connecting portion 12. Likewise, the left-side passage 10b of the seat body 1b has at its bottom one aperture in communication with the second passage 122 of the second connecting portion 12, and another two apertures in communication with the respective first and second passages 131, 132 of the third connecting portion 13. Additionally, the right-side passage 10a has an entrance 101 at the right side for reception of the first flow guide adapter 3; and the left-side passage 10b has an exit 102 at the left side for reception of the second flow guide adapter 4.

As shown in FIG. 13, the flow guide adapter 3, 4 and the partition wall 5 are configured to guide water flow through the seat body 1b as well as all the filter cartridges 21~23 in a predetermined order for water purification. In addition, the flow guide adapters 3, 4 are provided also for connection with external conduits (not shown). Each of the filter cartridges 21~23 has in its top a water inlet and a water outlet. The first and second flow guide adapters 3, 4 are identical to each other in structure. Particularly, the first flow guide adapter 3 is inserted in the entrance 101 of the right-side passage 10a of the seat body 1b; and the second flow guide adapter 4 is inserted in the exit 102 of the left-side passage 10b of the seat body 1b. The first flow guide adapter 3 has a tube fitting portion 31 nested in the entrance 101 for connection with a second conduit, a flow guiding portion 32 located in the right-side passage 10a and integrally extending from the tube fitting portion 31, and an interior tunnel 30 extending through the tube fitting portion 31 to the flow guiding portion 32. The second flow guide adapter 4 has a tube fitting portion 41 nested in the exit 102 for connection with a second conduit, a flow guiding portion 42 located in the left-side passage 10b and integrally extending from the tube fitting portion 41, and an interior tunnel 40 extending through the tube fitting portion 41 to the flow guiding portion 42.

The tube fitting portions 31, 41 of the first and second flow guide adapters 3, 4 of the third embodiment are identical in structure to those of the first embodiment, and therefore the descriptions of the parts of the third embodiment are omitted for the sake of brevity.

The flow guiding portion 32 of the first flow guide adapter 3 is configured to guide water flow from the first conduit to the first and second filter cartridges 21, 22 in series. Specifically, the flow guiding portion 32 has a radial opening 320 and a blocking wall 321. The radial opening 320 connects the interior tunnel 30 of the first flow guide adapter 3 and the first passage 111 of the first connecting portion 11 of the seat body 1b. The blocking wall 321 is situated in a position within the right-side passage 10a of the seat body 1b and between the first and second passages 111, 112 of the first connecting portion 11 of the seat body 1b. In this manner, the water flow in the interior tunnel 30 of the first flow guide adapter 3 from the first conduit may be blocked by the blocking wall 321 and turn through the radial opening 320 of the flow guiding portion 32 and the first passage 111 of the first connecting portion 11 of the seat body 1b into the first filter cartridge 21 for the first filtration. After the first filtration, the water flow will return back through the second passage 112 of the first connecting portion 11 to the right-side passage 10a of the seat body 1b.

The partition wall 5 is situated in a position within the main passageway of the seat body and between the first and second passages 121, 122 of the second connecting portion 12 of the seat body 1b to force the water flow in the right-side passage 10a of the seat body 1b to run through the first passage 121 of the second connecting portion 12 of the seat body 1b into the second filter cartridge 22 for the second filtration, and then return back through the second passage 122 of the second connecting portion 12 to the left-side passage 10b of the seat body 1b.

Similarly, the flow guiding portion 42 of the second flow guide adapter 4 is configured to guide water flow from the left-side passage 10b of the seat body 1b to the third filter cartridge 23. Specifically, the flow guiding portion 42 has a radial opening 420 and a blocking wall 421. The radial opening 420 connects the interior tunnel 40 of the second flow guide adapter 4 and the second passage 132 of the third connecting portion 13 of the seat body 1b. The blocking wall 421 is situated in a position within the left-side passage 10b of the seat body 1b and between the first and second passages 131, 132 of the third connecting portion 13 of the seat body 1b. In this manner, the water flow in the left-side passage 10b of the seat body 1b may run through the first passage 131 of the third connecting portion 13 of the seat body 1b into the third filter cartridge 23 for the third filtration, and then return back through the second passage 132 of the third connecting portion 13 and the radial opening 420 of the flow guiding portion 42 into the interior tunnel 40 of the second flow guide adapter 4, and finally to the second conduit.

As shown in the third embodiment, the water filtration system 300 receives the water flow from the first conduit with the interior tunnel 30 of the first flow guide adapter 3. Upon entry into the interior tunnel 30 of the first flow guide adapter 3, the water flow is firstly blocked by the blocking wall 321 of the flow guiding portion 32 and turns downward to the first filter cartridge 21 for the first filtration. Afterward, the water flow returns upward back to the right-side passage 10a of the seat body 1b, and then be secondly blocked by the partition wall 5, and turns downward to the second filter cartridge 22 for the second filtration. After the second filtration, the water flow returns upward to the interior tunnel 40 of the second flow guide adapter 4, and finally to the second conduit.

As described above, the water filtration system 300 of the third embodiment employs a seat body which supports three filter cartridges. The seat body has merely a single partition wall within the main passageway, and therefore can be easily formed in one piece without any demolding problem. Moreover, the water filtration system employs two unique flow guide adapters, which cooperates with the right-side and the left-side passages of the seat body to create a purification route for the water flow running through the filter cartridges in a predetermined order. Thus, the water filtration system is simple in structure and easy to manufacture.

Figure 15:
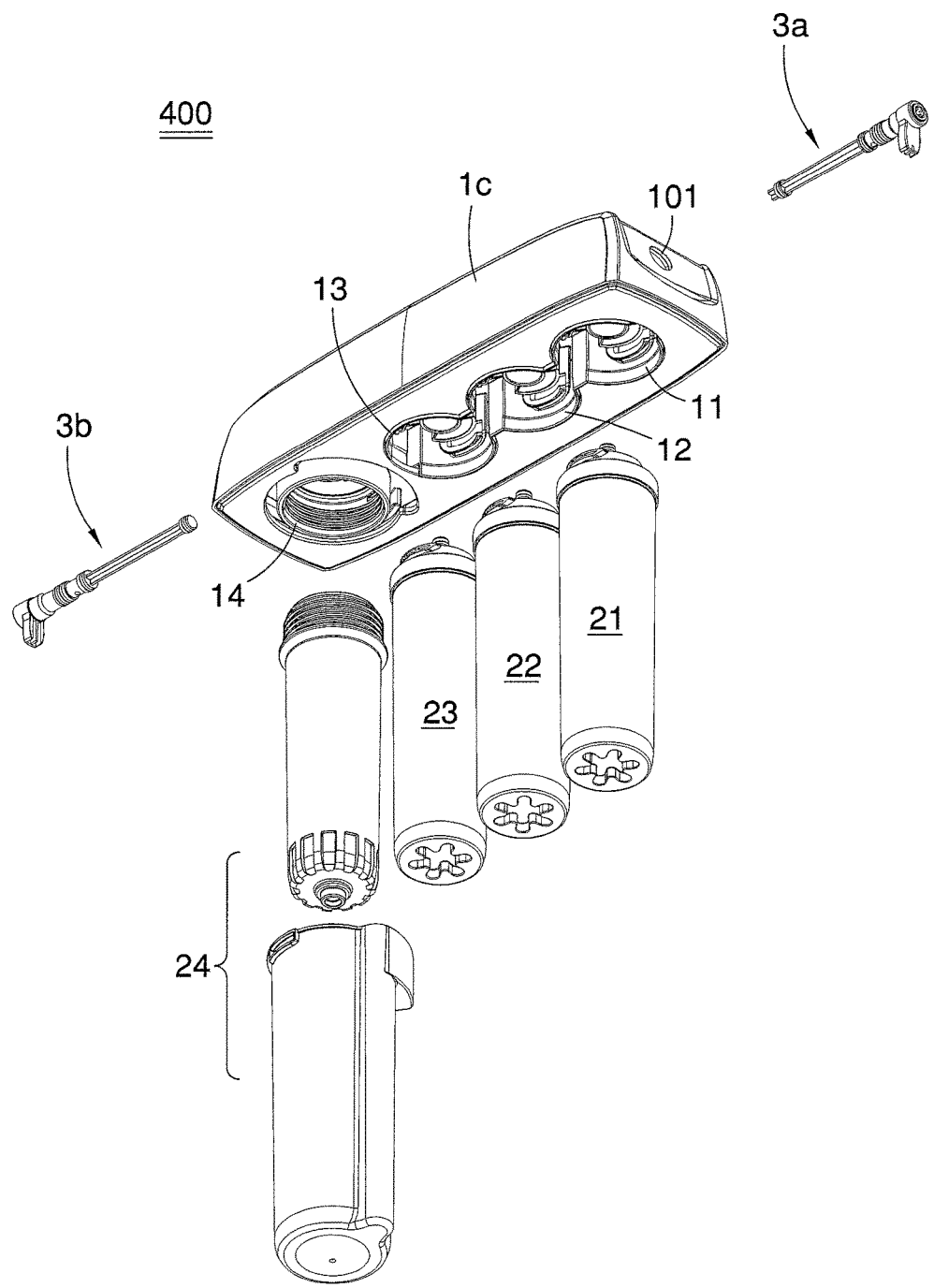
FIG. 15 is an exploded perspective view of the water filtration system shown in FIG. 14.
Figure 16:
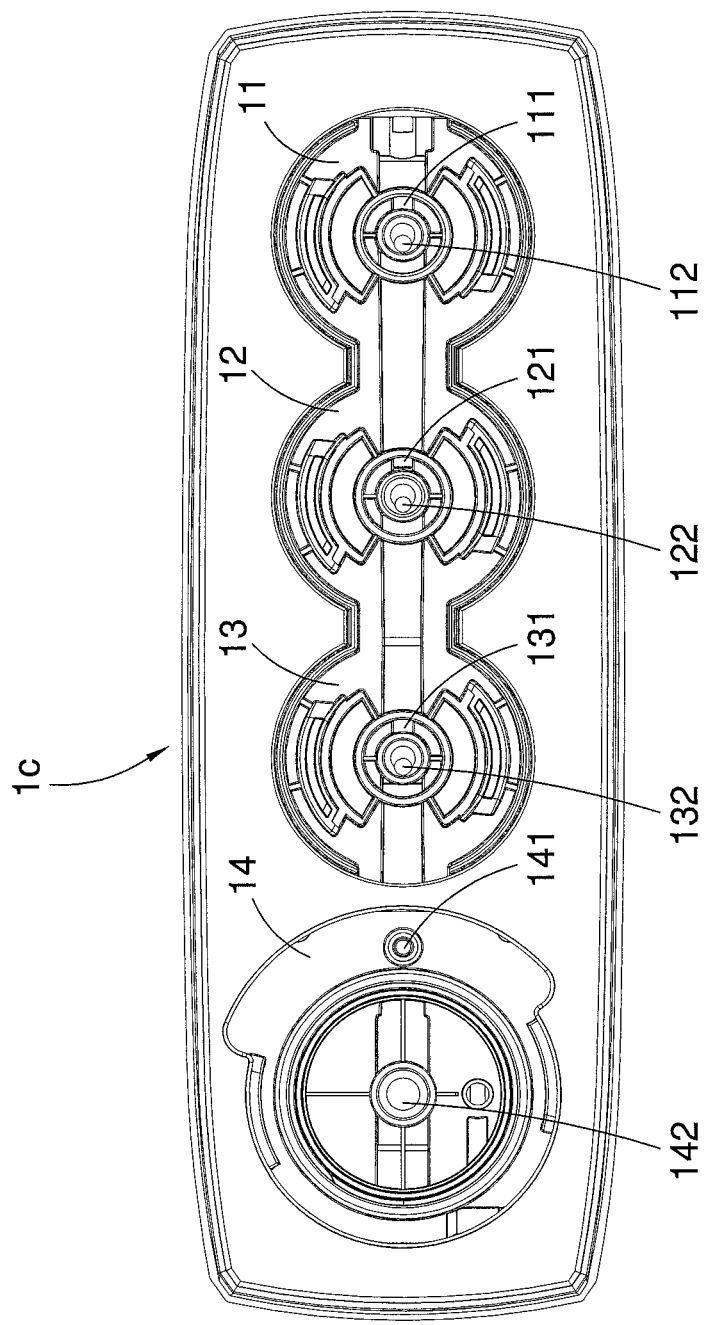
FIG. 16 is a bottom view of a seat body of the water filtration system shown in FIG. 15.
Figure 17:
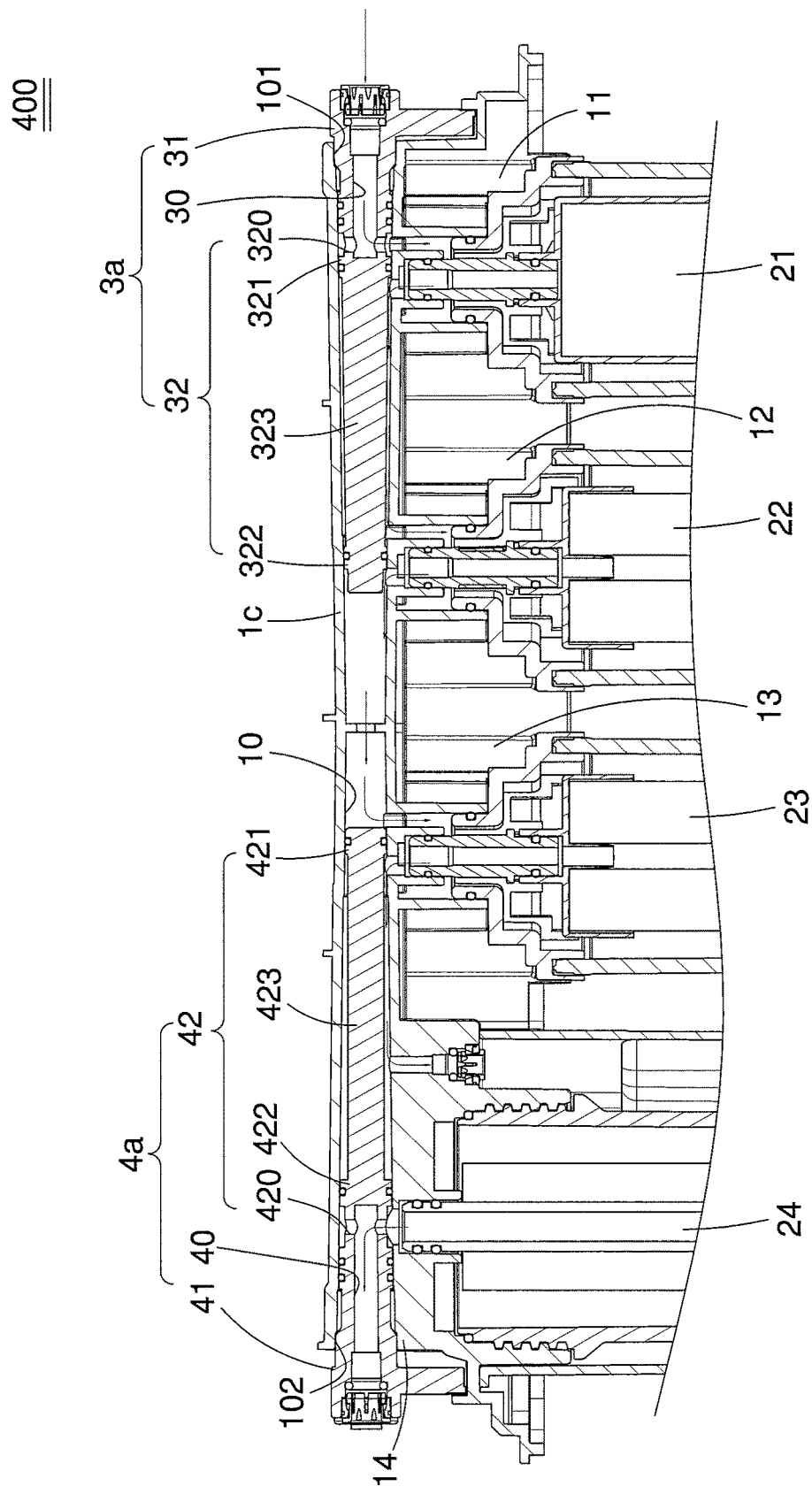
FIG. 17 is a cross-sectional view of the water filtration system shown in FIG. 14.
Figure 18:
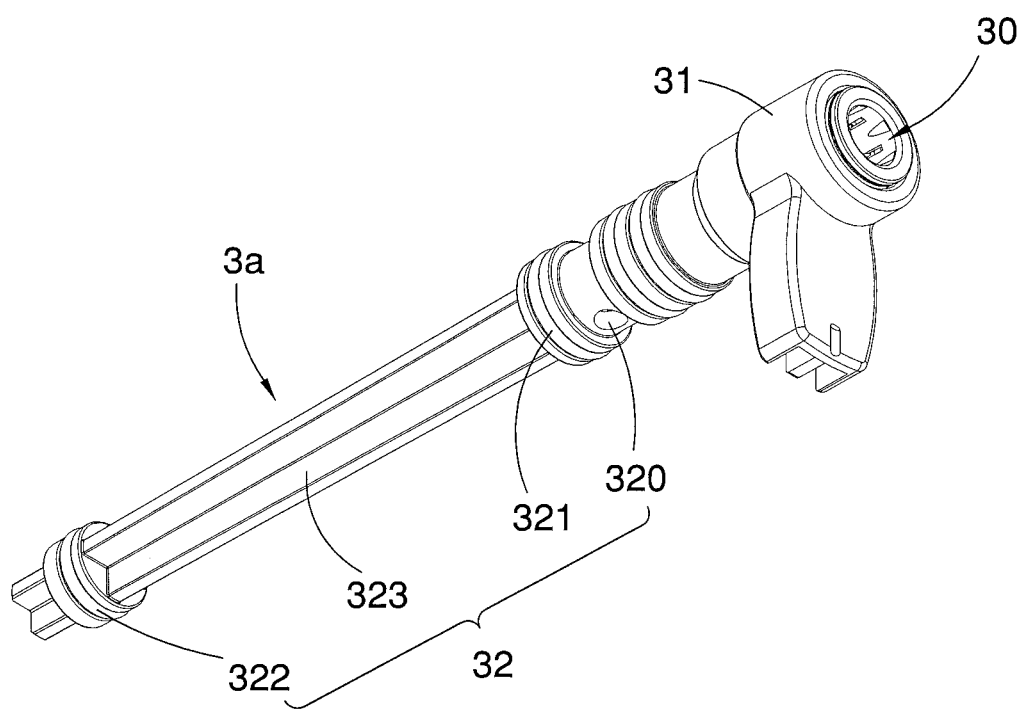
FIG. 18 is a perspective view of a first flow guide adapter of the water filtration system shown in FIG. 15.

With reference to FIGS. 14 to 19, a water filtration system 400 in accordance with a fourth embodiment will now be explained. In view of the similarity among the aforementioned embodiments, the parts of the fourth embodiment that are identical to the parts of the first, second or third embodiment will be given the same reference numerals as the parts of the first, second or third embodiment. As shown in FIG. 15, the water filtration system 400 includes a seat body 1c, four filter cartridges 21~24 detachably mounted underneath the seat body 1b, and two flow guide adapters 3a, 4a attached to two opposite sides of the seat body 1c. The first, second and third filter cartridges 21~23 are general filters and each has a cartridge member and a filter medium disposed within the cartridge member; and the fourth filter cartridge 24 is directed to a reverse osmosis filter cartridge with a drain opening (not shown) defined in a top thereof. Similar to the seat body 1 of the water filtration system 100, the seat body 1c of the water filtration system 400 has a cut-through mass passageway 10; however, unlike the first embodiment, the fourth embodiment employs the two flow guide adapters 3a, 4a, as shown in FIGS. 18 and 20, which are slightly different in structure from the flow guide adapters 3, 4 shown in FIGS. 5-8.

Specifically, the seat body 1c is formed at its bottom with fourth connecting portions 11~14 for connection with the fourth filter cartridges 21~24. As shown in FIGS. 16 and 17, the first connecting portion 11 defines first and second passages 111, 112 respectively connected downward to the water inlet and outlet of the first filter cartridge 21. Similarly, the second connecting portion 12 defines first and second passages 121, 122 respectively connected downward to the water inlet and outlet of the second filter cartridge 22; the third connecting portion 13 defines first and second passages 131, 132 respectively connected downward to the water inlet and outlet of the third filter cartridge 23; and the fourth connecting portion 14 defines first and second passages 141, 142 respectively connected downward to the water inlet and outlet of the fourth filter cartridge 24. As shown in FIG. 17, the main passageway 10 of the seat body 1c has at its bottom a plurality of apertures in communication with the first passages 111, 121, 131, 141 and the second passages 112, 122, 132, 142 of the connecting portions 11~14 of the seat body 1c. Additionally, the main passageway 10 of the seat body 1c has an entrance 101 at the right side for reception of the first flow guide adapter 3a, and an exit 102 at the left side for reception of the second flow guide adapter 4a.

Figure 19:
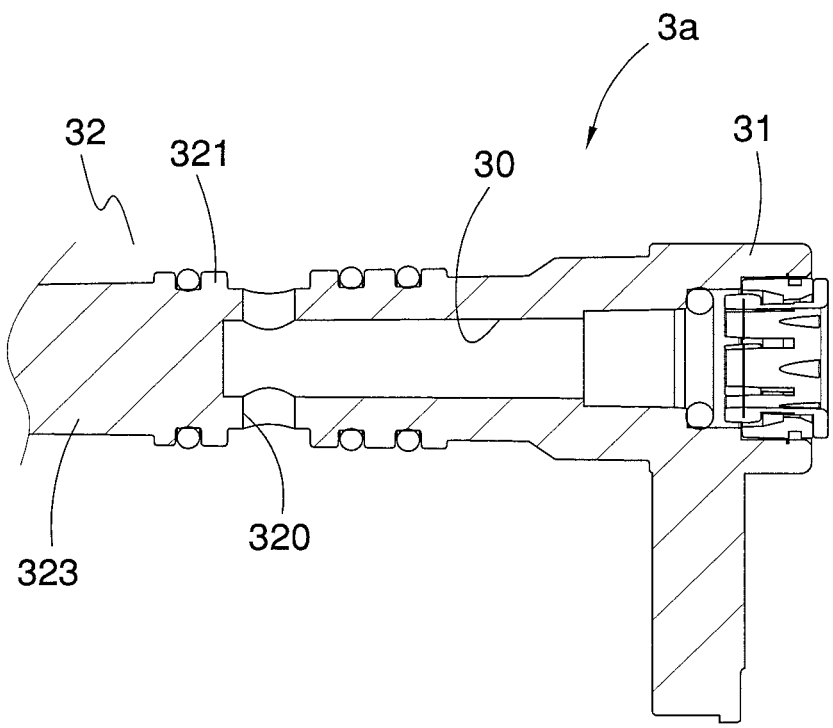
FIG. 19 is a cross-sectional view of the first flow guide adapter shown in FIG. 18.
Figure 20:
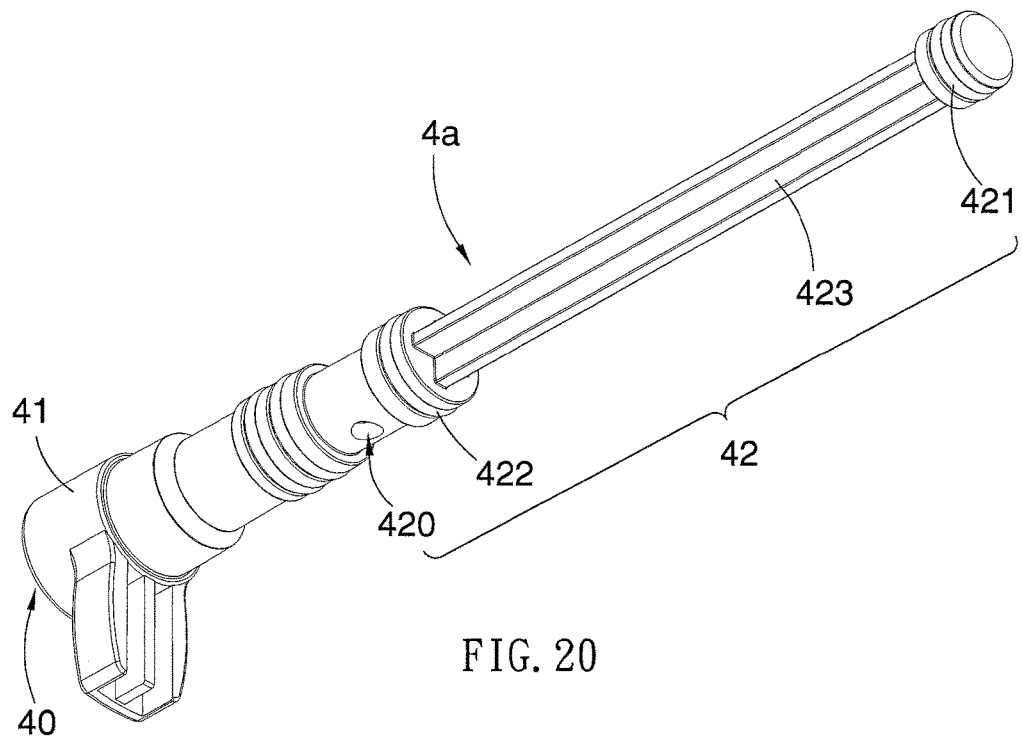
FIG. 20 is a perspective view of a second flow guide adapter of the water filtration system shown in FIG. 15.

As shown in FIGS. 18 and 19, the first flow guide adapter 3a includes a tube fitting portion 31 for connection with a first conduit, a flow guiding portion 32 and an interior tunnel 30 extending through the tube fitting portion 31 to the flow guiding portion 32 to receive water flow from the first conduit. In particular, the flow guiding portion 32 is configured to guide water flow from the first conduit to the first and second filter cartridges 21, 22 in series.

The tube fitting portions 31, 41 of the first and second flow guide adapters 3a, 4a of the fourth embodiment are identical in structure to those of the first embodiment, and therefore the descriptions of the parts of the fourth embodiment are omitted for the sake of brevity.

The flow guiding portion 32 of the first flow guide adapter 3a has a radial opening 320, a first blocking wall 321, a second blocking wall 322 and a shank 323. The radial opening 320 of the flow guiding portion 32 connects the interior tunnel 30 of the first flow guide adapter 3a and the first passage 111 of the first connecting portion 11 of the seat body 1c, as shown in FIG. 17. The first blocking wall 321 of the flow guiding portion 32 is situated in a position within the main passageway 10 of the seat body 1c and between the first and second passages 111, 112 of the first connecting portion 11 of the seat body 1c so as to force the water flow in the interior tunnel 30 of the first flow guide adapter 3 to run through the radial opening 320 of the flow guiding portion 32 and the first passage 111 of the first connecting portion 11 of the seat body 1c into the first filter cartridge 21, and then return back through the second passage 112 of the first connecting portion 11 to the main passageway 10 of the seat body 1c. The shank 323 is disposed in the main passageway 10 of the seat body 1c and connecting the first and second blocking walls 321, 322. Moreover, the shank 323 is formed with a plurality of ribs (not numbered) therearound. At least one channel is defined in between the outer wall of the ribs of the shank 323 and the inner wall of the main passageway 10 of the seat body 1c to receive the water flow returned back to the main passageway 10 from the first filter cartridge 21. Besides, the second blocking wall 322 is situated in a position within the main passageway 10 of the seat body 1c and between the first and second passages 121, 122 of the second connecting portion 12 of the seat body 1c to force the water flow in the channel of the flow guiding portion 32 to run through the first passage 121 of the second connecting portion 12 of the seat body 1c into the second filter cartridge 22, and then return back through the second passage 122 of the second connecting portion 12 into the main passageway 10 of the seat body 1c.

Figure 21:
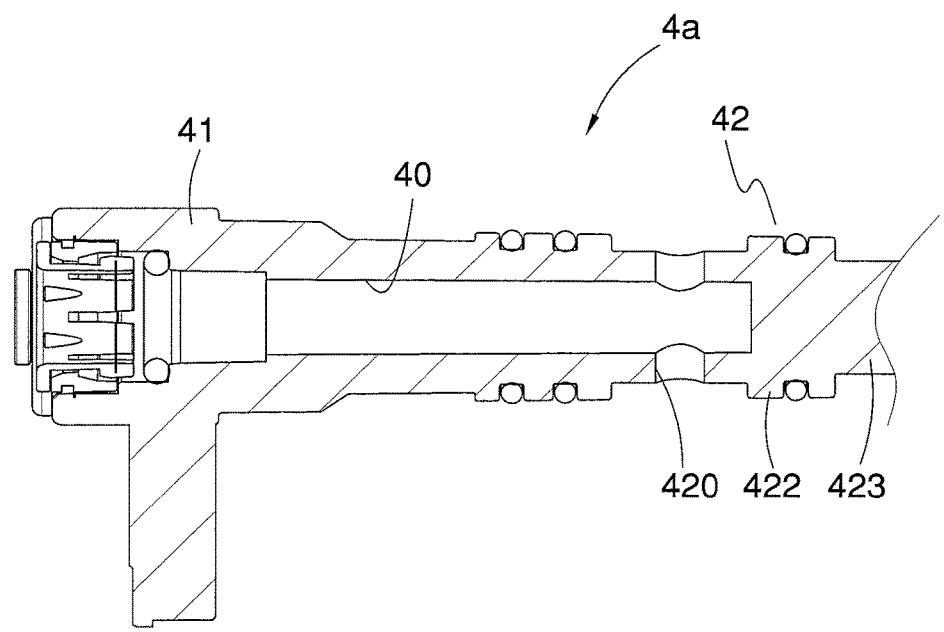
FIG. 21 is a cross-sectional view of the second flow guide adapter shown in FIG. 20.

Similarly, as shown in FIGS. 20 and 21, the second flow guide adapter 4a has a tube fitting portion 41 for connecting with a second conduit, a flow guiding portion 42 and an interior tunnel 40 extending through the tube fitting portion 41 to the flow guiding portion 42 to guide water flow to the second conduit. In particular, the flow guiding portion 42 is configured to guide water flow to the third and fourth filter cartridges 23, 24 and finally to the second conduit.

The flow guiding portion 42 of the second flow guide adapter 4a has a radial opening 420, a first blocking wall 421, a second blocking wall 422, a shank 423 disposed within the main passageway 10 of the seat body 1c and connecting the first and second blocking walls 421, 422, and at least one channel (not numbered) defined in between an outer wall of the shank 423 and an inner wall of the main passageway 10 of the seat body 1c to receive the water flow returned back to the main passageway 10 from the third filter cartridge 23.

More specifically, the radial opening 420 of the flow guiding portion 42 connects the interior tunnel 40 of the second flow guide adapter 4 and the second passage 142 of the fourth connecting portion 14 of the seat body 1c. The first blocking wall 421 is situated in a position within the main passageway 10 of the seat body 1c and between the first and second passages 131, 132 of the third connecting portion 13 of the seat body 1c to force the water flow in the main passageway 10 of the seat body 1c to run through the first passage 131 of the third connecting portion 13 of the seat body 1c into the third filter cartridge 23, and then return back through the second passage 132 of the third connecting portion 13 to the main passageway 10 of the seat body 1c. The second blocking wall 422 is situated in a position within the main passageway 10 of the seat body 1c and between the first and second passages 141, 142 of the fourth connecting portion 14 of the seat body 1c to force the water flow in the channel of the flow guiding portion 42 to run through the first passage 141 of the fourth connecting portion 14 of the seat body 1c into the fourth filter cartridge 24, and then return back through the second passage 142 of the fourth connecting portion 14 and the radical opening 420 of the flow guiding portion 42 into the interior tunnel 40 of the second flow guide adapter 4a, and finally to the second conduit.

As shown in the fourth embodiment, the water filtration system 400 receives the water flow from the first conduit with the interior tunnel 30 of the first flow guide adapter 3a. Upon entry into the interior tunnel 30 of the first flow guide adapter 3a, the water flow is firstly blocked by the first blocking wall 321 of the first flow guide adapter 3a and turns downward to the first filter cartridge 21 for the first filtration. Later, the water flow returns upward back to the main passageway 10 of the seat body 1c, and soon be secondly blocked by the second blocking wall 322 of the first flow guide adapter 3a, and turns downward to the second filter cartridge 22 for the second filtration. After the second filtration, the water flow again returns upward to the main passageway 10 of the seat body 1c, and then be thirdly blocked by the first blocking wall 421 of the second flow guide adapter 4a, and have to turn downward to the third filter cartridge 23 for the third filtration. After the third filtration, the water flow once again returns upward to the main passageway 10 of the seat body 1c, and then be fourthly blocked by the second blocking wall 422 of the second flow guide adapter 4a and turns downward to the fourth filter cartridge 24 for the fourth filtration. After the fourth filtration, the purified water flow returns upward back to the interior tunnel 40 of the second flow guide adapter 4a, and finally to the second conduit.

As described above, the water filtration system 400 of the fourth embodiment employs a seat body which supports fourth filter cartridges. The seat body has no partition wall in the main passageway, and therefore can be easily formed in one piece without any demolding problem. Moreover, the water filtration system employs two unique flow guide adapters, which cooperates with the main passageway of the seat body to create a purification route for the water flow running through the filter cartridges in a predetermined order. Thus, the water filtration system is simple in structure and easy to manufacture.

It should be evident that this disclosure is by way of example and that various changes may be made by adding, modifying or eliminating details without departing from the fair scope of the teaching contained in this disclosure.

What is claimed is:

1. A water filtration system comprising:
 a first filter cartridge having in its top a water inlet and a water outlet;
 a second filter cartridge comprising in its top a water inlet and a water outlet;
 a seat body having at its bottom a first connecting portion defining vertical first and second passages respectively in communication with the water inlet and outlet of the first filter cartridge, a second connecting portion comprising vertical first and second passages respectively in communication with the water inlet and outlet of the second filer cartridge, a horizontal main passageway in its top, and a partition wall being integrally formed in the main passageway of the seat body and dividing the main passageway into a left-side passage and a right-side passage, wherein the main passageway comprises:
 an entrance in communication with the first and second passages of the first connecting portion via the main passageway; and
 an exit in communication with the second passage of the second connecting portion via the main passageway; and
 a first flow guide adapter inserted in the entrance of the main passageway of the seat body, and having a tube fitting portion for connection with a first conduit, a flow guiding portion integrally extending from the tube fitting portion, and an interior tunnel extending from the tube fitting portion to the flow guiding portion for receiving water flow from the first conduit, and the flow guiding portion comprising:
 a radial opening in communication with the interior tunnel of the first flow guide adapter and the first passage of the first connecting portion; and
 a first blocking wall located in the main passageway and between the first and second passages of the first connecting portion to force the water in the interior tunnel of the first flow guide adapter to go into the first filter cartridge via the radial opening of the flow guiding portion and the first passage of the first connecting portion and then return to the main passageway via the second passage of the first connecting portion.

2. The water filtration system as recited in claim 1, further comprising a second flow guide adapter inserted in the exit of the main passageway of the seat body, and having a tube fitting portion for connection with a second conduit, a flow guiding portion integrally extending from the tube fitting portion, and an interior tunnel extending from the tube fitting portion to the flow guiding portion;
 wherein the flow guiding portion of the second flow guide adapter has a radial opening and a blocking wall, the radial opening is in communication with the interior tunnel of the second flow guide adapter and the second passage of the second connecting portion, the blocking wall is situated in the main passageway of the seat body and between the first and second passages of the second connecting portion of the seat body to force the water in the main passageway of the seat body to go through the first passage of the second connecting portion of the seat body into the second filter cartridge, and then return through the second passage of the second connecting portion and the radial opening of the flow guiding portion into the interior tunnel of the second flow guide adapter and finally to the second conduit.

3. The water filtration system as recited in claim 1, wherein the tube fitting portion of the first flow guide adapter includes:
 a coupling body disposed in the entrance of the main passageway of the seat body and connected with the flow guiding portion;
 an annular seat disposed in the coupling body;
 a clamping claw disposed in the annular seat to receive and clasp the first conduit;

a plurality of first engaging teeth disposed on an outer periphery of the annular seat to secure the annular seat within the coupling body; and a plurality of second engaging teeth disposed on an inner periphery of the clamping claw to grip the first conduit once the first conduit is inserted into the clamping claw.

4. A water filtration system comprising:

a first filter cartridge, a second filter cartridge, and a third filter cartridge, wherein each of the first, second and third filter cartridges comprises in its top a water inlet and a water outlet;

a seat body comprising:

first, second and third connecting portions each of which comprises first and second passages respectively in communication with the water inlet and outlet of the first, second and third filter cartridges;

a main passageway comprising an entrance, an exit and a plurality of apertures defined in a bottom thereof and in communication with the respective first and second passages of the first, second and third connecting portions of the seat body;

a partition wall being integrally formed in the main passageway of the seat body and dividing the main passageway into a left-side passage and a right-side passage, wherein the partition wall is located between the first and second passages of the second connecting portion of the seat body to force the water in the right-side passage of the seat body to go into the second filter cartridge through the first passage of the second connecting portion of the seat body and then return to the left-side passage of the seat body through the second passage of the second connecting portion;

a first flow guide adapter inserted in the entrance of the right-side passage of the seat body, and comprising:

an interior tunnel;

a tube fitting portion formed at an end of the interior tunnel and adapted for connection to a first conduit;

a flow guiding portion formed at another end of the interior tunnel and comprising:

a radial opening in communication with the interior tunnel of the first flow guide adapter and the first passage of the first connecting portion; and a first blocking wall located in the main passageway of the seat body and between the first and second passages of the first connecting portion of the seat body to force water in the interior tunnel of the first flow guide adapter to go into the first filter cartridge via the radial opening of the flow guiding portion and the first passage of the first connecting portion of the seat body and then return to the main passageway of the seat body via the second passage of the first connecting portion;

a second flow guide adapter inserted in an exit of the left-side passage of the seat body and comprising a tube fitting portion for connection with a second conduit, a flow guiding portion integrally extending from the tube fitting portion, and an interior tunnel extending from the tube fitting portion to the flow guiding portion; wherein the flow guiding portion is configured to guide water flow from the left-side passage of the seat body to the third filter cartridge; wherein the flow guiding portion of the second flow guide adapter has a radial opening and a blocking wall, the radial opening is in communication with the interior tunnel of the second flow guide adapter and the second passage of the third connecting portion, the blocking wall is situated in a position within the left-side passage of the seat body and between the first and second passages of the third connecting portion of the seat body to force the water flow in the left-side passage of the seat body to go through the first passage of the third connecting portion of the seat body into the third filter cartridge, and then return through the second passage of the third connecting portion and the radial opening of the flow guiding portion into the interior tunnel of the second flow guide adapter and finally to the second conduit.

* * * * *